United States Patent
Yui et al.

(10) Patent No.: US 12,368,594 B2
(45) Date of Patent: Jul. 22, 2025

(54) CONTROL DEVICE

(71) Applicant: FANUC CORPORATION, Yamanashi (JP)

(72) Inventors: Yumeki Yui, Yamanashi (JP); Takeshi Kimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 228 days.

(21) Appl. No.: 18/010,117

(22) PCT Filed: Jun. 24, 2021

(86) PCT No.: PCT/JP2021/023913
§ 371 (c)(1),
(2) Date: Dec. 13, 2022

(87) PCT Pub. No.: WO2022/004544
PCT Pub. Date: Jan. 6, 2022

(65) Prior Publication Data
US 2023/0353370 A1 Nov. 2, 2023

(30) Foreign Application Priority Data
Jun. 30, 2020 (JP) .................................. 2020-112468

(51) Int. Cl.
*H04L 9/32* (2006.01)
(52) U.S. Cl.
CPC .................. *H04L 9/3234* (2013.01)
(58) Field of Classification Search
CPC . G06F 21/572; G06F 21/6209; H04L 9/3234; H04L 63/065; H04L 69/18
See application file for complete search history.

(56) References Cited

U.S. PATENT DOCUMENTS 6,178,244 B1 * 1/2001 Takeda .................. H04L 63/065
713/168
11,379,586 B2 * 7/2022 Fu ........................... G06F 21/64
(Continued)

FOREIGN PATENT DOCUMENTS

JP 2010-98367 4/2010
JP 2011-242988 12/2011
(Continued)

OTHER PUBLICATIONS

International Search Report issued Sep. 7, 2021 in corresponding International Application No. PCT/JP2021/023913.

*Primary Examiner* — Lizbeth Torres-Diaz
(74) *Attorney, Agent, or Firm* — Wenderoth, Lind & Ponack, L.L.P.

(57) ABSTRACT

Reduce inventory cost without preparing a control device for each destination in advance. This control device is for controlling industrial machinery and includes an encryption unit, and comprises: an encryption device unit that includes a plurality of encryption units corresponding to each of a plurality of destinations, and a plurality of invalidation units that invalidate any one of the plurality of encryption units or invalidate the plurality of encryption units; and an operating unit that, depending on the destination of the control device, selects invalidation of the encryption units by specifying to each of the plurality of invalidation units to invalidate one of the plurality of encryption units or to invalidate the plurality of encryption units.

5 Claims, 6 Drawing Sheets

(56) References Cited

U.S. PATENT DOCUMENTS

| | | | | |
|---|---|---|---|---|
| 2007/0033399 A1* | 2/2007 | Takeda | ...................... | H04L 9/16 |
| | | | | 713/168 |
| 2020/0042709 A1* | 2/2020 | Fu | ......................... | G06F 9/4401 |

FOREIGN PATENT DOCUMENTS

| | | |
|---|---|---|
| JP | 2015-138527 | 7/2015 |
| WO | 2021/019637 | 2/2021 |

* cited by examiner

CONTROL DEVICE

TECHNICAL FIELD

The present invention relates to a control device.

BACKGROUND ART

For an end-user numerical control device, there is known a technology for preventing a machining program from being illegally reused, by requesting the machining program that has been encrypted from a host computer of a machine tool builder based on communication setting information set in advance, decrypting the received encrypted machining program and executing the decrypted machining program to control a machine tool. See, for example, Japanese Unexamined Patent Application, Publication No. 2015-138527.

Patent Document 1: Japanese Unexamined Patent Application, Publication No. 2015-138527

DISCLOSURE OF THE INVENTION

Problems to be Solved by the Invention

In order to protect internal data (for example, a program of a machine tool builder) of a control device that controls an industrial machine such as a machine tool or a robot and prevent firmware thereof from being falsified, it will be important in the future to mount an encryption chip with a reliable encryption function on the control device.

However, as for an encryption technology for the same control device to be sold, control device sellers are required to comply with laws and regulations of each destination country (area), and, additionally, there are some laws and regulations under which it is not possible to sell the control device in a state in which an encryption technology compatible with a certain destination country (area) is usable, to another destination country (area). Therefore, there may be cases where it is not possible to satisfy the laws and regulations of all the destination countries (areas) by one kind of encryption chip.

Therefore, the control device sellers are required to use an appropriate encryption chip for each destination country (area), for example, and therefore it is necessary to prepare a plurality of control devices equipped with different encryption chips for different countries (areas).

Further, it is necessary for machine tool builders that perform product development, incorporating a control device into a machine tool or a production system to, in the case of shipment to different countries, have control devices equipped with encryption chips that correspond to the respective countries in stock. Therefore, there is also a problem for the machine tool builders that much inventory cost (manufacturing cost) is required.

Therefore, it is desired to, without preparing control devices for respective destinations in advance, reduce the inventory cost.

Means for Solving the Problems

One aspect of the control device of the present disclosure is a control device controlling an industrial machine and including encryption units, the control device including: an encryption device unit including a plurality of the encryption units corresponding to a plurality of respective destinations and a plurality of disabling units disabling any of the plurality of encryption units or disabling a plurality of the encryption units; and an operation unit specifying causing any of the plurality of encryption units to be disabled or causing a plurality of the encryption units to be disabled, to each of the plurality of disabling units according to a destination of the control device, and selecting disabling of the encryption units.

Effects of the Invention

According to one aspect, it is possible to, without preparing control devices for respective destinations in advance, reduce the inventory cost.

PREFERRED MODE FOR CARRYING OUT THE INVENTION

One embodiment will be described below using drawings. Here, a machine tool is exemplified as an industrial machine, and a numerical control device is exemplified as a control device. The present invention is not limited to a machine tool and is also applicable, for example, to an industrial robot and a service robot. In this case, the control device is a robot control device.

One Embodiment

Figure 1:
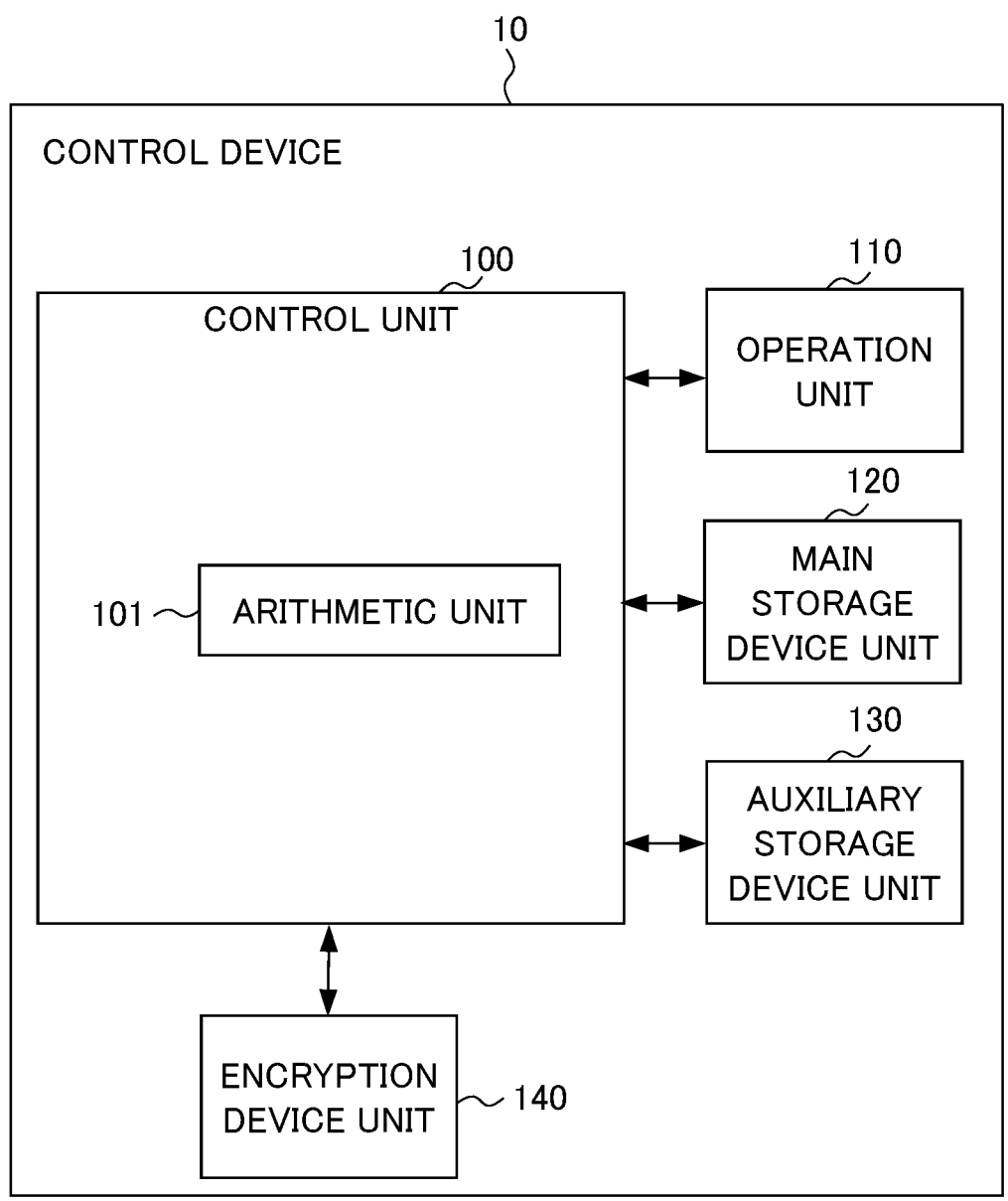
FIG. 1 is a functional block diagram showing an example of a functional configuration of a control device according to one embodiment.

FIG. 1 is a functional block diagram showing a functional configuration example of a control device according to one embodiment.

A control device 10 is a numerical control device that is publicly known to those skilled in the art, and the control device 10 generates an operation command based on control information and outputs the generated operation command to a machine tool (not shown). Thereby, the control device 10 controls the operation of the machine tool (not shown). If the machine tool (not shown) is a robot or the like, the control device 10 may be a robot control device or the like.

The control device 10 and the machine tool (not shown) may be mutually and directly connected through a connection interface not shown. The control device 10 and the machine tool (not shown) may be mutually connected via a network not shown, such as a LAN (local area network) or the Internet. In this case, the control device 10 is provided with a communication unit not shown, which is for performing mutual communication via the connection.

Here, the machine tool not shown is, for example, a machine tool, a robot or a peripheral device. The machine tool not shown is not limited to a machine tool, a robot or a peripheral device but can be widely applied to industrial machines in general. The industrial machines include various machines, for example, a machine tool, an industrial robot, a service robot, a forging machine and an injection molding machine.

As shown in FIG. 1, the control device 10 has a control unit 100, an operation unit 110, a main storage device unit 120, an auxiliary storage device unit 130 and an encryption device unit 140. The control unit 100, the operation unit 110, the main storage device unit 120, the auxiliary storage device unit 130 and the encryption device unit 140 are communicably connected via a bus not shown.

<Operation Unit 110>

The operation unit 110 is, for example, a keyboard of an MDI unit, a touch panel of a display unit or physical rotary switches, which are not shown and are included in the control device 10, and accepts an operation from a seller of the control device 10 or a designer of a machine tool builder or the like.

Specifically, the operation unit 110 accepts specification of a destination of the control device 10 based on an operation by a designer of a machine tool builder or the like, and specifies disabling target security chips among n security chips included in the encryption device unit 140 described later, according to the accepted destination (n is an integer equal to or greater than 2).

If the auxiliary storage device unit 130 described later stores, for example, a destination table (not shown) in which each of the n security chips of the encryption device unit 140 is associated with a destination, in advance, and the operation unit 110 accepts specification of a destination of the control device 10 and selects a security chip that is compatible to the specified destination and is to remain enabled, then the control unit 100 described later may judge disabling target security chips based on the selected security chip and the destination table (not shown).

<Main Storage Device Unit 120>

The main storage device unit 120 is a memory, for example, a RAM (random access memory) and stores data that is temporarily required for the control unit 100 described later to execute a program.

<Auxiliary Storage Device Unit 130>

The auxiliary storage device unit 130 is, for example, a ROM (read-only memory), an HDD (hard disk drive) or a flash memory.

Figure 2:
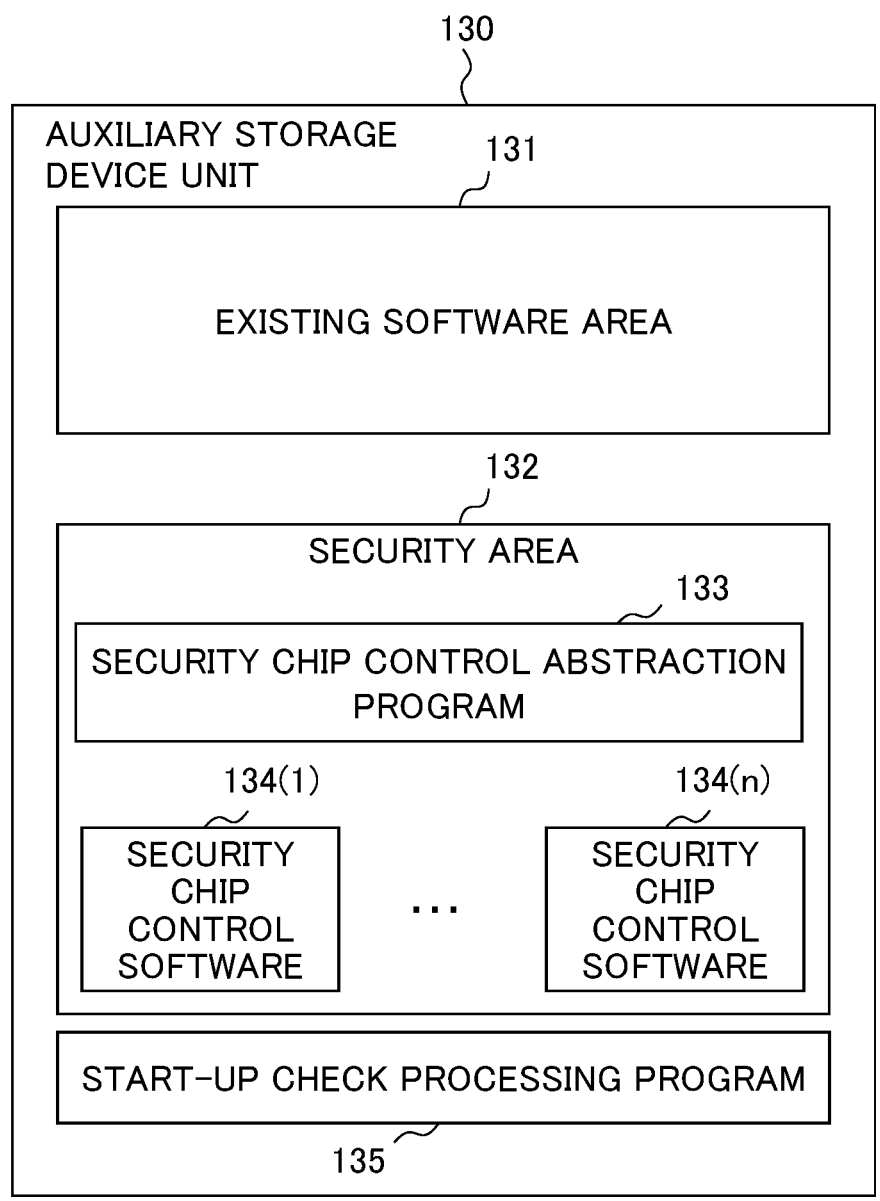
FIG. 2 is a diagram showing an example of data stored in an auxiliary storage device unit.

FIG. 2 is a diagram showing an example of data stored in the auxiliary storage device unit 130.

As shown in FIG. 2, the auxiliary storage device unit 130 has an existing software area 131 for storing a system program, application programs and the like to be executed by the control unit 100 described later. Further, the auxiliary storage device unit 130 has a security area 132 for storing pieces of security chip control software 134(1) to 134(n) to execute each of the n security chips included in the encryption device unit 140 described later.

Each of the pieces of security chip control software 134(1) to 134(n) realizes an encryption process corresponding to a destination (for example, any area (country) among areas (countries) of a first area (country) to an n-th area (country)) of the control device 10 by executing one corresponding security chip among the n security chips as the encryption units included in the encryption device unit 140 described later.

The auxiliary storage device unit 130 may manage each of the pieces of software stored in the existing software area 131 and the pieces of security chip control software 134(1) to 134(n) stored in the security area 132 on a filename basis. By doing so, the auxiliary storage device unit 130 can delete pieces of software instructed to be deleted by the control unit 100 described later, based on a filename. Alternatively, the auxiliary storage device unit 130 may perform address management of each of the pieces of software stored in the existing software area 131 and the pieces of security chip control software 134(1) to 134(n) stored in the security area 132 on a file system. By doing so, the auxiliary storage device unit 130 can delete pieces of software instructed to be deleted based on addresses from the control unit 100 described later because an address at which and a range in which each piece of software is stored are known in advance.

The auxiliary storage device unit 130 may store a security chip control abstraction program 133 and a start-up check processing program 135.

By executing the security chip control abstraction program 133 by the control unit 100 (specifically, an arithmetic unit 101) described later, it is enabled to instruct pieces of security chip control software 134(j) that execute control for security chips (j) ($1 \leq j \leq n$) by an abstracted common interface. Such an abstraction process is publicly known to those skilled in the art, and detailed description will be omitted.

By executing the start-up check processing program 135 by the control unit 100 (specifically, the arithmetic unit 101) at start-up of the control device 10, a check process for the configuration, settings and the like of the control device 10 is executed. A start-up check processing function unit (a start-up check processing unit) provided by executing the start-up check processing program 135 will be described later.

<Encryption Device Unit 140>

Figure 3:
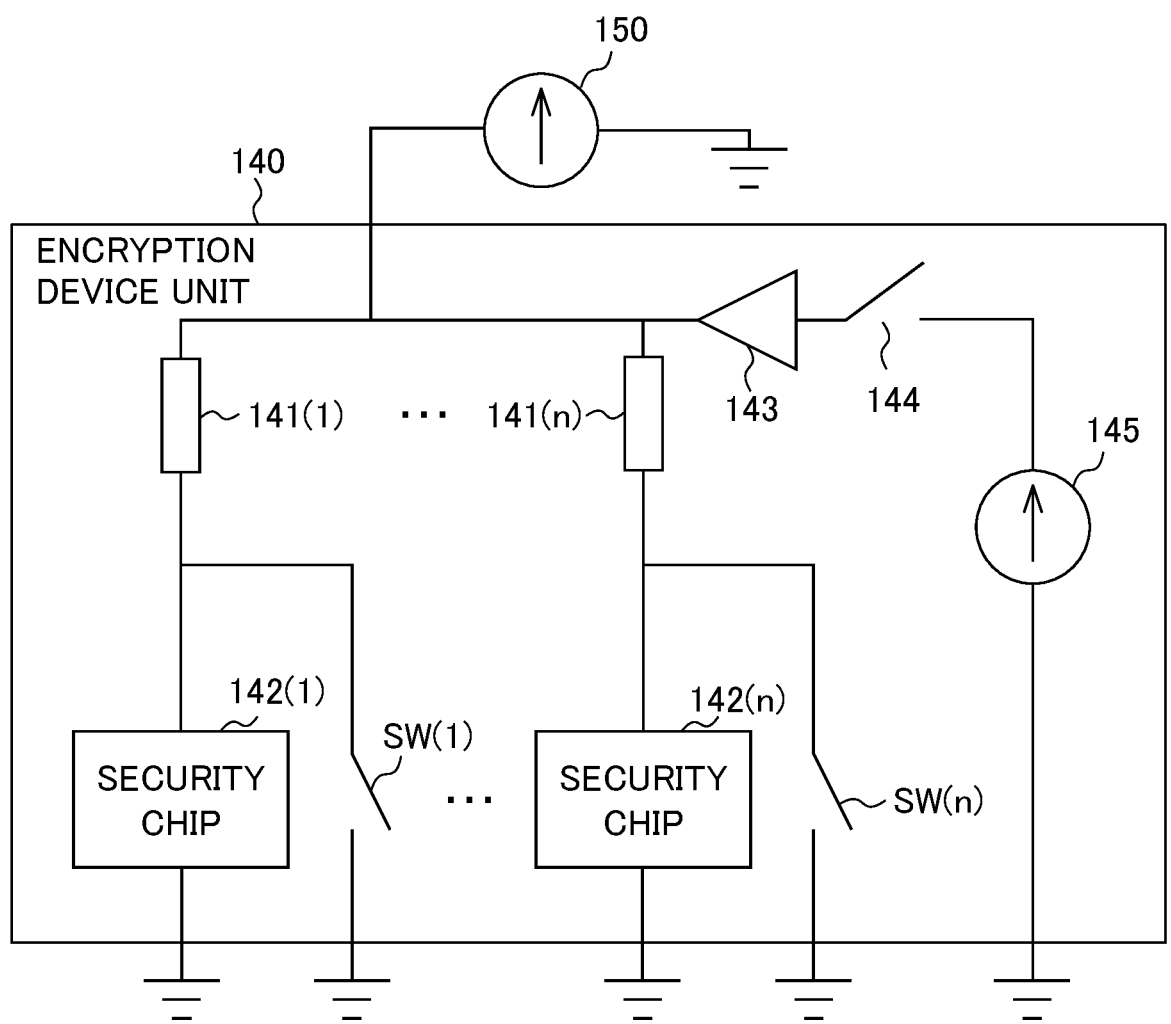
FIG. 3 is a diagram showing a configuration example of an encryption device unit.

FIG. 3 is a diagram showing an example of the configuration of the encryption device unit 140.

As shown in FIG. 3, the encryption device unit 140 has n fuses 141(1) to 141(n), n security chips 142(1) to 142(n), n switches SW(1) to SW(n), a diode 143, a switch 144 and a power supply 145. The n fuses 141(1) to 141(n), the n security chips 142(1) to 142(n), the n switches SW(1) to SW(n), the diode 143, the switch 144 and the power supply 145 may be arranged on one control circuit not shown.

The power supply 145 is, for example, an external constant current source that supplies power required for each of the security chips 142(1) to 142(n) to operate.

The fuses 141(1) to 141(n) are connected to the security chips 142(1) to 142(n), respectively, and operate as disabling units.

As the security chips 142(1) to 142(n) as the encryption units, for example, TPMs (trusted platform modules), which are security chips complying with security specifications defined by TCG (Trusted Computing Group) (R) can be applied. The security chips 142(1) to 142(n) are assumed to be TPMs but are not limited thereto. For example, the security chips 142(1) to 142(n) may be discrete TPMs equipped with TPM-compliant dedicated chips as encryption units, and encryption by the discrete TPMs is also possible. Further, the security chips 142(1) to 142(n) may be firmware TPMs executed in a security area inside a microcomputer as encryption units, and encryption by the firmware TPMs is also possible. Alternatively, the security chips 142(1) to 142(n) may be discrete ICs that do not comply with the TPM standard as encryption units, and encryption by the discrete ICs is also possible. Further, the security chips 142(1) to 142(n) may be software encryption by a microcomputer, as encryption units.

As described above, each of the security chips 142(1) to 142(n) specified, for example, for each destination (any area (country) among areas (countries) of the first area (country) to the n-th area (country)) can perform an encryption process corresponding to each of the security chips 142(1) to 142(n), which is specific to each destination by executing each of corresponding pieces of security chip control software 134(1) to 134(n) stored in the security area 132.

The switches SW(1) to SW(n), the diode 143, the switch 144 and the power supply 145 operates as a load application circuit, for example, based on a control instruction from the control unit 100 described later.

Specifically, for example, if the operation unit 110 accepts specification of the i-th area (country) as a destination of the control device 10, the switch SW(i) is turned off, and the switches SW(j) (j≠i) other than the switch SW(i) are turned on, based on a control instruction from the control unit 100 described later, in order to disconnect the disabling target security chips 142(j) (j≠i) other than the security chip 142(i) from the control circuit. Here, i is an integer between 1 and n inclusive. In this case, when the switch 144 is turned on based on an instruction from the control unit 100 described later, the fuses 141(j) (j≠i) other than the fuse 141(i) are burned off by power from the power supply 145 being applied to the fuses 141(j) other than the fuse 141(i). Thereby, the security chips 142(j) other than the security chip 142(i) are disconnected from the control circuit and disabled.

The switches SW(1) to SW(n) and the switch 144 operating as the load application circuit may have a malfunction prevention function of not performing a disabling process if all the security chips 142(j) (j≠i) other than the security chip 142(i) are disconnected from the control circuit.

Further, by the diode 143 and the switch 144 as the load application circuit being provided, it is possible to decide the timing of the disabling process and it is possible to avoid a destination being decided by mistake because the disabling process is not started at once when the power is turned on. However, the diode 143 and the switch 144 may not be provided on the load application circuit.

The power supply 145 is a constant current source that supplies power required to burn off the fuses 141(1) to 141(n).

<Control Unit 100>

The control unit 100 is provided with the arithmetic unit 101 and is, for example, a processor that controls the control device 10 as a whole. The control unit 100 is communicably connected to the main storage device unit 120 and the auxiliary storage device unit 130 via a bus not shown.

The arithmetic unit 101 reads the system program and the application programs stored in the existing software area 131 of the auxiliary storage device unit 130 via the bus and controls the whole control device 10 according to the system program and the application programs.

Similarly, the arithmetic unit 101 reads the security chip control abstraction program 133, the pieces of security chip control software 134(1) to 134(n) and the start-up check processing program 135 that are stored in the auxiliary storage device unit 130 via the bus and controls a security process related to the control device 10 according to the system program and the application programs.

Thereby, as shown in FIG. 1, the control unit 100 is configured to realize the security chip control abstraction function described above and a start-up check processing function.

If at least one of the disabling target security chips 142(j) (j≠i) other than the security chip 142(i) is disabled by operation of the load application circuit of the switches SW(1) to SW(n) and the switch 144 arranged in the encryption device unit 140, the control unit 100 may delete a piece of security chip control software 134(j) (j≠i) corresponding to the disabled security chip 142(j) from the auxiliary storage device unit 130.

Specifically, for example, if the operation unit 110 accepts specification of the i-th area (country) as a destination of the control device 10 from a designer of a machine tool builder or the like, the control unit 100 turns off the switch SW(i) and turns on switches SW other than the switch SW(i) in order to disconnect security chips 142 other than the security chip 142(i) from the control circuit. Then, by turning on the switch 144, the control unit 100 burns off the fuses 141(j) (j≠i) other than the fuse 141(i) to disconnect the disabling target security chips 142(j) other than the security chip 142(i) from the control circuit and disable them. At this time, the control unit 100 may delete all the pieces of security chip control software 134(j) (j≠i) other than the piece of security chip control software 134(i) from the auxiliary storage device unit 130.

By doing so, a seller of the control device 10 can sell the control device 10 to a machine tool builder or the like without setting the destination which the control device 10 is for at the time of shipment; and a designer of a machine tool builder or the like can, by performing an operation of setting a destination of the control device 10 before shipment of a machine tool, cause the control device 10 to have only an encryption function for the selected destination.

Since the disabling target security chips 142(j) (j≠i) are not used at the destination, the pieces of security chip control software 134(j) (j≠i) other than the piece of security chip control software 134(i), which include security information not related to the destination, are not left. Thereby, it is possible to reduce the risk of being hacked. Further, by deleting the pieces of security chip control software 134(j) (j≠i) other than the piece of security chip control software 134(i) before shipment to the destination, it is possible to obtain an effect that the pieces of security chip control software 134(j) (j≠i) other than the piece of security chip control software 134(i) are not influenced by a disclosure request and the like by laws of the destination.

Deletion of the pieces of security chip control software 134(j) (j≠i) may be performed by deletion after zero rewriting, deletion after random number rewriting or the like that is publicly known to those skilled in the art.

For example, it is conceivable that, when the fuses 141(j) (j≠i) other than the fuse 141(i) are being burned off in order to disconnect the disabling target security chips 142(j) (j≠i) other than the security chip 142(i) from the control circuit, a designer of a machine tool builder or the like may turn off the power supply of the control device 10 by mistake, for example. In this case, there is a possibility that such a risk occurs that a part of the fuses 141(j) (j≠i) other than the fuse 141(i) are not burned off, and a part of the disabling target security chips 142(j) (j≠i) remain connected to the control circuit.

Therefore, the control unit 100 may, for example, store identification information about the security chip 142(i) corresponding to the destination of the control device 10 in the auxiliary storage device unit 130. By doing so, the control unit 100 may judge, by starting up the start-up check processing program 135 when the control device 10 is started up, whether all the security chips 142(j) (j≠i) other than the security chip 142(i) are disconnected from the control circuit or not based on the identification information about the security chip 142(i) stored in the auxiliary storage device unit 130 and a publicly known disconnection detection method.

Specifically, for example, the control unit 100 transmits a control command to each of the disabling target security chips 142($j$) ($j \neq i$) other than the security chip 142($i$) by executing the start-up check processing program 135. The control unit 100 may judge whether all the disabling target security chips 142($j$) ($j \neq i$) are disconnected from the control circuit or not based on whether responses to the control commands are received or not. That is, by executing the start-up check processing program 135, the control unit 100 may judge that, if a correct response is returned from a disabling target security chip 142($j$) ($j \neq i$), the disabling target security chip 142($j$) is connected and judge that the disabling target security chips 142($j$) are disconnected if an incorrect response or no response is returned.

If detecting that a disabling target security chip 142 is not disconnected from the control circuit at start-up, the control unit 100 may disable the control device 10 from starting up; and output an alert indicating that a disabling target security chip 142($j$) ($j \neq i$) is not disconnected from the control circuit and display the alert on the display unit not shown of the control device 10. After that, resetting of the security chip 142 may be performed, for example, by a seller of the control device 10 or the like.

However, when the disabling process is executed once, the control unit 100 may store an area (country) to be left as a result of the first disabling process in the auxiliary storage device unit 130 so that a designer of a machine tool builder or the like does not change the destination to a different destination by mistake. The control unit 100 may be adapted to, if a designer of a machine tool builder or the like tries to set a destination different from the destination set first, output an alert or the like indicating that a destination different from the destination set first is going to be set and display the alert on the display unit not shown of the control device 10.

By doing so, when a destination is specified once, the control device 10 can certainly disable the disabling target security chips 142($j$) ($j \neq i$) and certainly delete the pieces of security chip control software 134($j$) ($j \neq i$) corresponding to the disabling target security chips 142($j$) ($j \neq i$) from the auxiliary storage device unit 130 before the control device 10 becomes usable by a user.

<Process for Deletion of Security Chips not Usable at Destination of Control Device 10>

Next, operation related to a deletion process of the control device 10 according to the present embodiment will be described.

Figure 4:
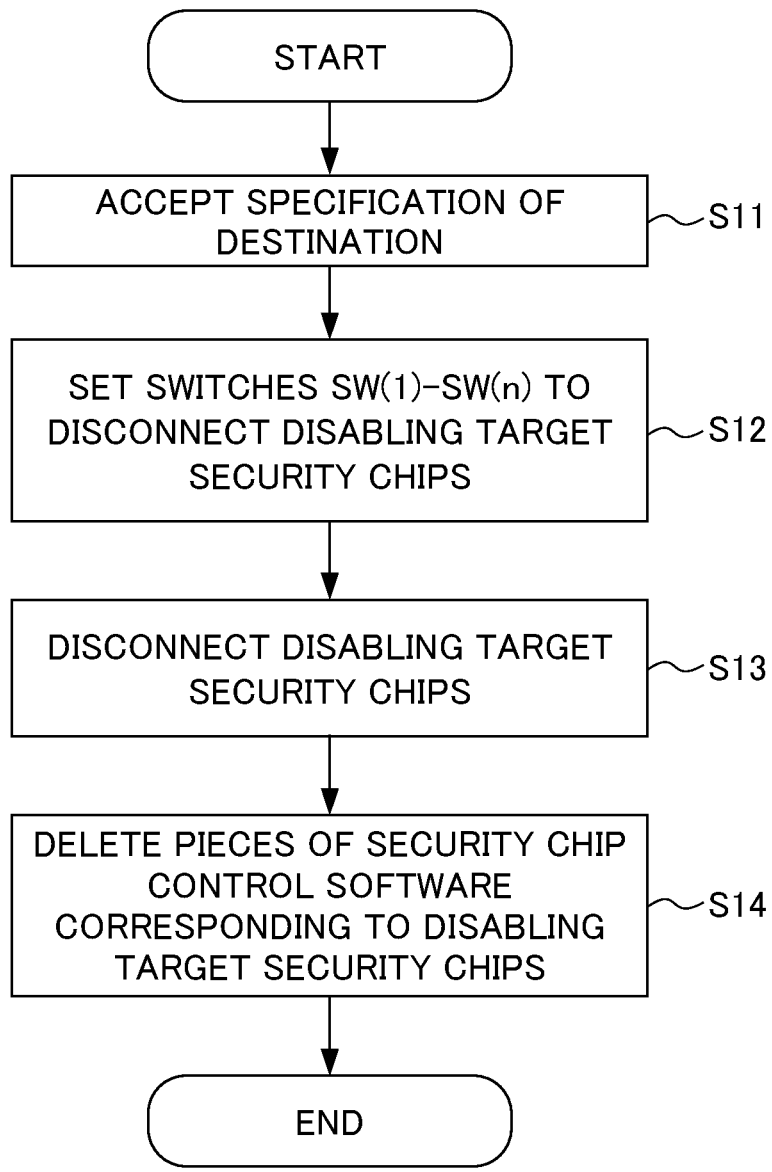
FIG. 4 is a flowchart describing a process for deleting a security chip that is not usable at a destination of the control device.

FIG. 4 is a flowchart describing the process for deleting security chips that are not usable at a destination of the control device 10. The flow shown here is executed each time a destination of the control device 10 is specified.

At Step S11, the operation unit 110 accepts specification of a destination of the control device 10 based on an input operation by a designer of a machine tool builder or the like.

At Step S12, in order to disconnect the disabling target security chips 142($j$) ($j \neq i$) other than a security chip 142($i$) corresponding to the destination specified at Step S11 from the control circuit, the control unit 100 sets the switch SW($i$) and the switches SW($j$) ($j \neq i$) other than the switch SW($i$) to OFF and ON, respectively.

At Step S13, by turning on the switch 144, the control unit 100 burns off the fuses 141($j$) ($j \neq i$) other than the fuse 141($i$) to disconnect the disabling target security chips 142($j$) ($j \neq i$) from the control circuit.

At Step S14, the arithmetic unit 101 deletes the pieces of security chip control software 134($j$) corresponding to the disabling target security chips 142($j$) from the auxiliary storage device unit 130.

<Process at Start-Up of Control Device 10>

Next, operation related to a process at start-up of the control device 10 according to the present embodiment will be described.

Figure 5:
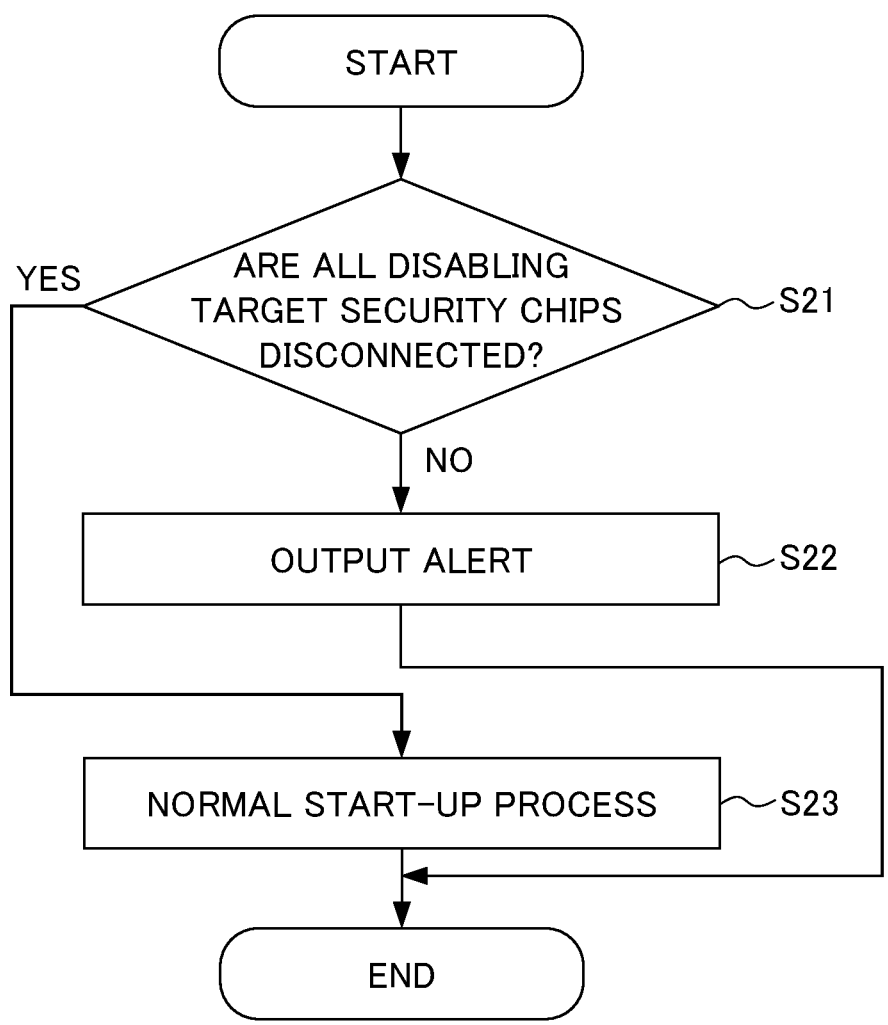
FIG. 5 is a flowchart describing a process at start-up of the control device.

FIG. 5 is a flowchart describing a deletion process at start-up of the control device 10. The flow shown here is executed each time the control device 10 is started up.

At Step S21, at start-up, the control unit 100 judges whether all the disabling target security chips 142($j$) ($j \neq i$) other than the security chip 142($i$) of a destination are disconnected from the control circuit or not, by executing the start-up check processing program 135. If all the disabling target security chips 142($j$) ($j \neq i$) are disconnected from the control circuit, the process proceeds to Step S23. On the other hand, if all the disabling target security chips 142($j$) ($j \neq i$) are not disconnected from the control circuit, the process proceeds to Step S22.

At Step S22, the control unit 100 disables the control device 10 from starting up; outputs an alert indicating that a disabling target security chip 142($j$) ($j \neq i$) is not disconnected from the control circuit and displays the alert on the display unit not shown; and ends the start-up process.

At Step S23, the control unit 100 performs a normal start-up process of the control device 10.

As described above, the control device 10 according to one embodiment has the security chips 142(1) to 142($n$) having encryption functions corresponding to a plurality of respective areas in advance. When accepting specification of a destination of the control device 10 based on an input operation by a designer of a machine tool builder or the like, the control device 10 can disable disabling target security chips 142($j$) ($j \neq i$) other than a security chip 142($i$) corresponding to the specified destination by disconnecting the disabling target security chips 142($j$) ($j \neq i$) from the control circuit.

Thereby, it is possible to, without preparing control devices 10 for respective destinations in advance, reduce the inventory cost. That is, it becomes unnecessary for a seller of the control device 10 to prepare stock for each destination, and it is possible to reduce the inventory cost of the seller of the control device 10. Further, it becomes unnecessary for a machine tool builder and a production system integrator to prepare stock of control devices 10 for each destination, and it is possible to reduce the inventory cost.

Further, by deleting all the pieces of security chip control software 134($j$) ($j \neq i$) corresponding to the disabling target security chips 142($j$) ($j \neq i$), the control device 10 can reduce the risk of being hacked.

Further, at start-up, the control device 10 judges whether all the disabling target security chips 142($j$) ($j \neq i$) other than the security chip 142($i$) corresponding to a destination are disconnected from the control circuit or not. Then, if all the disabling target security chips 142($j$) ($j \neq i$) are not disconnected, the control device 10 may disable the control device 10 from starting up and display an alert indicating that a disabling target security chip 142($j$) ($j \neq i$) is not disconnected from the control circuit on the display unit not shown of the control device 10. By doing so, resetting of the security chips 142 may be performed, for example, by a seller of the control device 10 or the like.

One embodiment has been described above. However, the control device 10 is not limited to the above embodiment, and modifications, improvements and the like within a range within which it is possible to achieve the object are included.

Modification Example 1

Though the encryption device unit 140 has a configuration as shown in FIG. 3 in the above embodiment, the encryption device unit 140 is not limited thereto.

Figure 6:
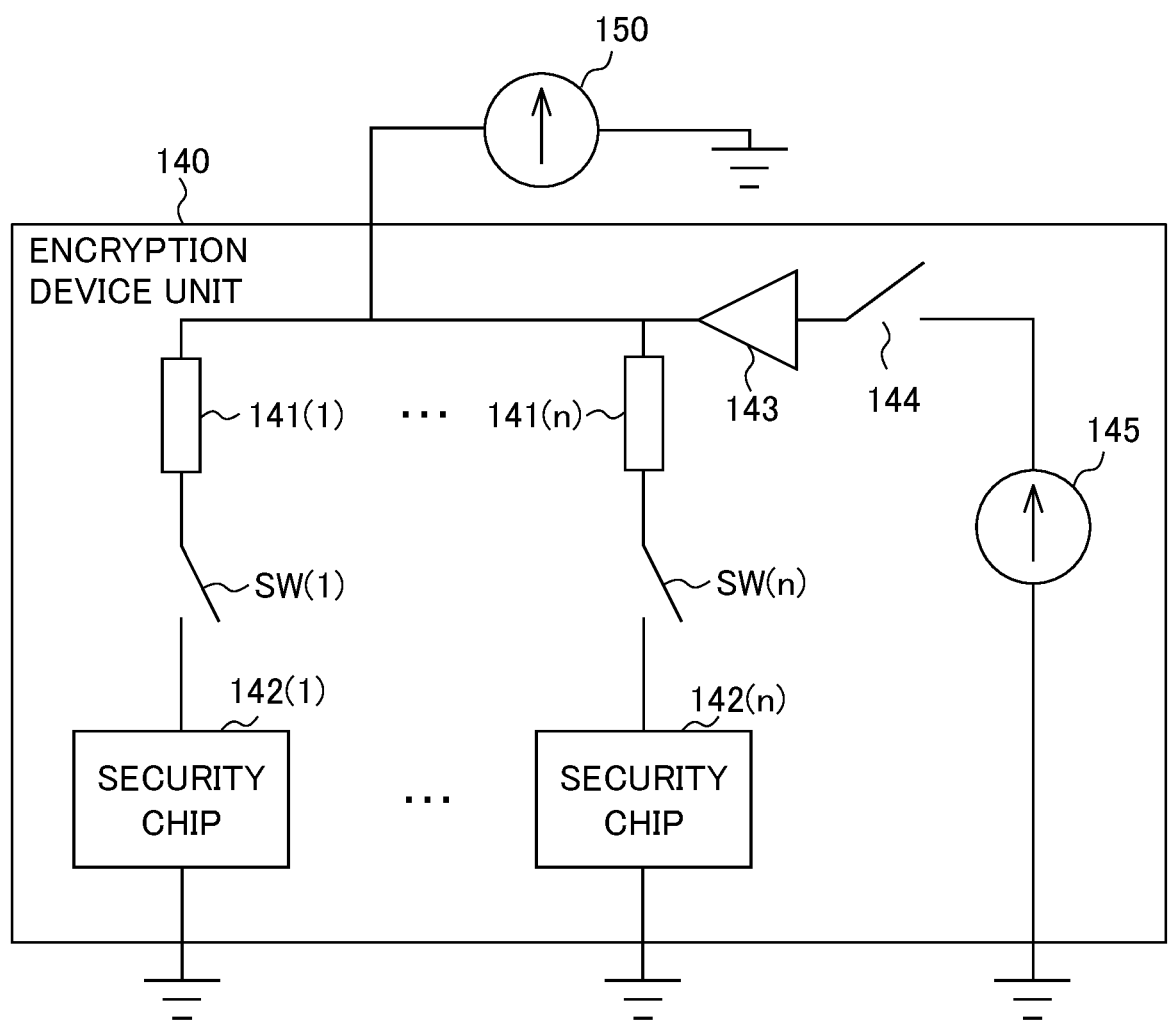
FIG. 6 is a diagram showing a configuration example of the encryption device unit.

FIG. 6 is a diagram showing a configuration example of the encryption device unit 140. As for elements having functions similar to those of elements of the encryption device unit 140 of FIG. 3, the same reference characters will be given, and detailed description of the elements will be omitted.

As shown in FIG. 6, each of the fuses 141(1) to 141($n$), each of the switches SW(1) to SW(n) and each of the security chips 142(1) to 142($n$) are connected in series. For example, if accepting specification of the i-th area (country) as a destination of the control device 10, the arithmetic unit 101 may disconnect the disabling target security chips 142 other than the security chip 142($i$) from the control circuit by turning off the switch SW(i) and turning on the switches SW other than the switch SW(i) similarly to the case of FIG. 3.

Modification Example 2

For example, in the above embodiment, if all the disabling target security chips 142($j$) ($j \neq i$) other than the security chip 142($i$) of the destination are not disconnected from the control circuit at start-up by executing the start-up check processing program 135, the control unit 100 outputs an alert indicating that a disabling target security chip 142($j$) ($j \neq i$) is not disconnected from the control circuit and displays the alert on the display unit not shown of the control device 10. However, the control device 10 is not limited thereto.

For example, the control unit 100 may disconnect all the disabling target security chips 142($j$) ($j \neq i$) from the control circuit again by executing the start-up check processing program 135 at re-start-up of the control device 10. Further, the control unit 100 may delete the pieces of security chip control software 134($j$) ($j \neq i$) corresponding to the disabling target security chips 142($j$) ($j \neq i$) from the auxiliary storage device unit 130.

By doing so, the control device 10 can certainly disable all the disabling target security chips 142($j$) ($j \neq i$) other than the security chip 142($i$) and certainly delete all the pieces of security chip control software 134($j$) ($j \neq i$) corresponding to the disabling target security chips 142($j$) ($j \neq i$) from the auxiliary storage device unit 130.

Each function included in the control device 10 according to one embodiment can be realized by hardware, software or a combination thereof. Here, being realized by software means being realized by a computer reading and executing a program.

Each component included in the control device 10 can be realized by hardware including an electronic circuit and the like, software or a combination thereof.

The program can be stored using various types of non-transitory computer readable media and be supplied to the computer. The non-transitory computer readable media include various types of tangible storage media. Examples of the non-transitory computer readable media include magnetic recording media (e.g., a flexible disk, a magnetic tape, and a hard disk drive), magnetic optical recording media (e.g., a magnetic optical disk), a CD-read only memory (CD-ROM), a CD-R, a CD-R/W, and semiconductor memories (e.g., a mask ROM, a programmable ROM (PRPM), an erasable PROM (EPROM), a flash ROM, and a RAM). The program may be supplied to the computer by various types of transitory computer readable media. Examples of the transitory computer readable media include an electric signal, an optical signal, and an electromagnetic wave. The transitory computer readable medium can supply the program to the computer via a wired communication path such as an electric wire or an optical fiber or a wireless communication path.

Steps describing the program recorded on the recording medium include not only processes performed in time-series in the order of the processes but also processes that are not necessarily performed in time-series but are executed in parallel or individually.

To summarize the above, a control device of the present disclosure can take various kinds of embodiments having the following configuration.

(1) The control device 10 of the present disclosure is a control device controlling an industrial machine and including encryption units, the control device including: an encryption device unit 140 including a plurality of security chips 142 corresponding to a plurality of respective destinations and a plurality of disabling units disabling any of the plurality of security chips 142 or disabling a plurality of the security chips 142; and an operation unit 110 specifying causing any of the plurality of security chips 142 to be disabled or causing a plurality of the security chips 142 to be disabled, to each of the plurality of disabling units according to a destination of the control device 10, and selecting disabling of the security chips 142.

According to the control device 10, it is possible to, without preparing control devices 10 for respective destinations in advance, reduce the inventory cost.

(2) In the control device 10 according to (1), each of the security chips 142(1) to 142($n$) may be at least any security chip among a TPM, a discrete TPM equipped with a TPM-compliant dedicated chip, a firmware TPM executed in a security area inside a microcomputer, or a discrete IC that does not comply with the TPM standard.

By doing so, the control device 10 can use a desired security chip.

(3) In the control device 10 according to (1) or (2), the disabling units are fuses 141(1) to 141($n$); and the encryption device unit 140 may include a load application circuit causing fuses 141($j$) ($j \neq i$) to operate so as to disable disabling target security chips 142($j$) ($j \neq i$) other than a security chip 142(1) corresponding to the destination.

By doing so, the control device 10 can certainly disconnect the disabling target security chips 142($j$) ($j \neq i$).

(4) The control device 10 according to (3) may include: an auxiliary storage device unit 130 storing a plurality of pieces of security chip control software 134(1) to 134($n$) controlling respective operations of the plurality of security chips 142(1) to 142($n$); and an arithmetic unit 101 deleting, if at least one of the disabling target security chips 142 is disabled by the fuses 141(1) to 141($n$), a piece of security chip control software 134 corresponding to the disabled security chip 142 from the auxiliary storage device unit 130.

By doing so, the control device 10 can reduce the risk of being hacked.

(5) The control device 10 according to (4) may further include a start-up check processing unit judging whether all the disabling target security chips 142($j$) ($j \neq i$) are disabled or not at start-up of the control device 10; wherein, if it is judged by the start-up check processing unit that all the disabling target security chips 142($j$) ($j \neq i$) are not disabled, the arithmetic unit 101 may output an alert indicating that all the disabling target security chips 142($j$) ($j\neq i$) are not disabled.

By doing so, the control device 10 can certainly disable all the disabling target security chips 142($j$) ($j\neq i$) before the control device 10 becomes usable by a user.

(6) In the control device 10 according to (5), the load application circuit may have a malfunction prevention function of not performing a disabling process if it is judged by the start-up check processing unit that all the disabling target security chips 142($j$) ($j\neq i$) are disabled.

By doing so, the control device 10 can safely disable all the disabling target security chips 142.

(7) In the control device 10 according to any of (4) to (6), the arithmetic unit 101 may store the destination of the control device 10 in the auxiliary storage device unit 130 and, if the operation unit 110 accepts a destination different from the destination stored in the auxiliary storage device unit 130, output an alert indicating that the destination is different from the destination stored in the auxiliary storage device unit 130.

By doing so, the control device 10 can, if a designer of a machine tool builder or the like attempts to change a destination set once to another destination again, notify the designer of the machine tool builder or the like that a destination is already set.

EXPLANATION OF REFERENCE NUMERALS

10 Control device
100 Control unit
101 Arithmetic unit
110 Operation unit
120 Main storage device unit
130 Auxiliary storage device unit
131 Existing software area
132 Security area
134(1)-134($n$) Security chip control software
135 Start-up check processing program
140 Encryption device unit
141(1)-141($n$) Fuse
142(1)-142($n$) Security chip
SW(1)-SW(n), 144 Switch

The invention claimed is:

1. A control device controlling an industrial machine and comprising encryption units, the control device comprising:
   an encryption device unit comprising a plurality of combinations of an encryption unit and a disabling unit disabling the encryption unit which correspond to a plurality of respective destinations;
   a memory that stores program and a plurality of pieces of control software controlling respective operations of a plurality of the encryption unit; and
   a processor configured to execute the program and control the control device to:
   judges, when specification of a destination of the control device is accepted, a disabling target encryption unit from among the plurality of the encryption unit according to the accepted destination;
   wherein the disabling unit is fuse;
   wherein the encryption device unit comprises
   a load application circuit causing a plurality of the disabling unit to operate so as to disable disabling target encryption units other than an encryption unit corresponding to the destination; and
   wherein the processor deletes, if at least one of the disabling target encryption units is disabled by the plurality of disabling unit, a piece of control software corresponding to the disabled disabling target encryption unit from the memory.

2. The control device according to claim 1, wherein the encryption unit is at least any security chip among a TPM (trusted platform module), a discrete TPM equipped with a TPM-compliant dedicated chip, a firmware TPM executed in a security area inside a microcomputer, or a discrete IC that does not comply with the TPM standard.

3. The control device according to claim 1, further wherein the processor
   judges whether all the disabling target encryption units are disabled or not at start-up of the control device; and
   if it is judged that all the disabling target encryption units are not disabled, outputs an alert indicating that all the disabling target encryption units are not disabled.

4. The control device according to claim 3, wherein the load application circuit has a malfunction prevention function of not performing a disabling process if it is judged that all the disabling target encryption units are disabled.

5. The control device according to claim 1, wherein the processor
   stores the destination of the control device in the memory and, if a destination different from the destination stored in the memory is accepted, outputs an alert indicating that the destination is different from the destination stored in the memory.

* * * * *